United States Patent Office 3,344,899
Patented Oct. 3, 1967

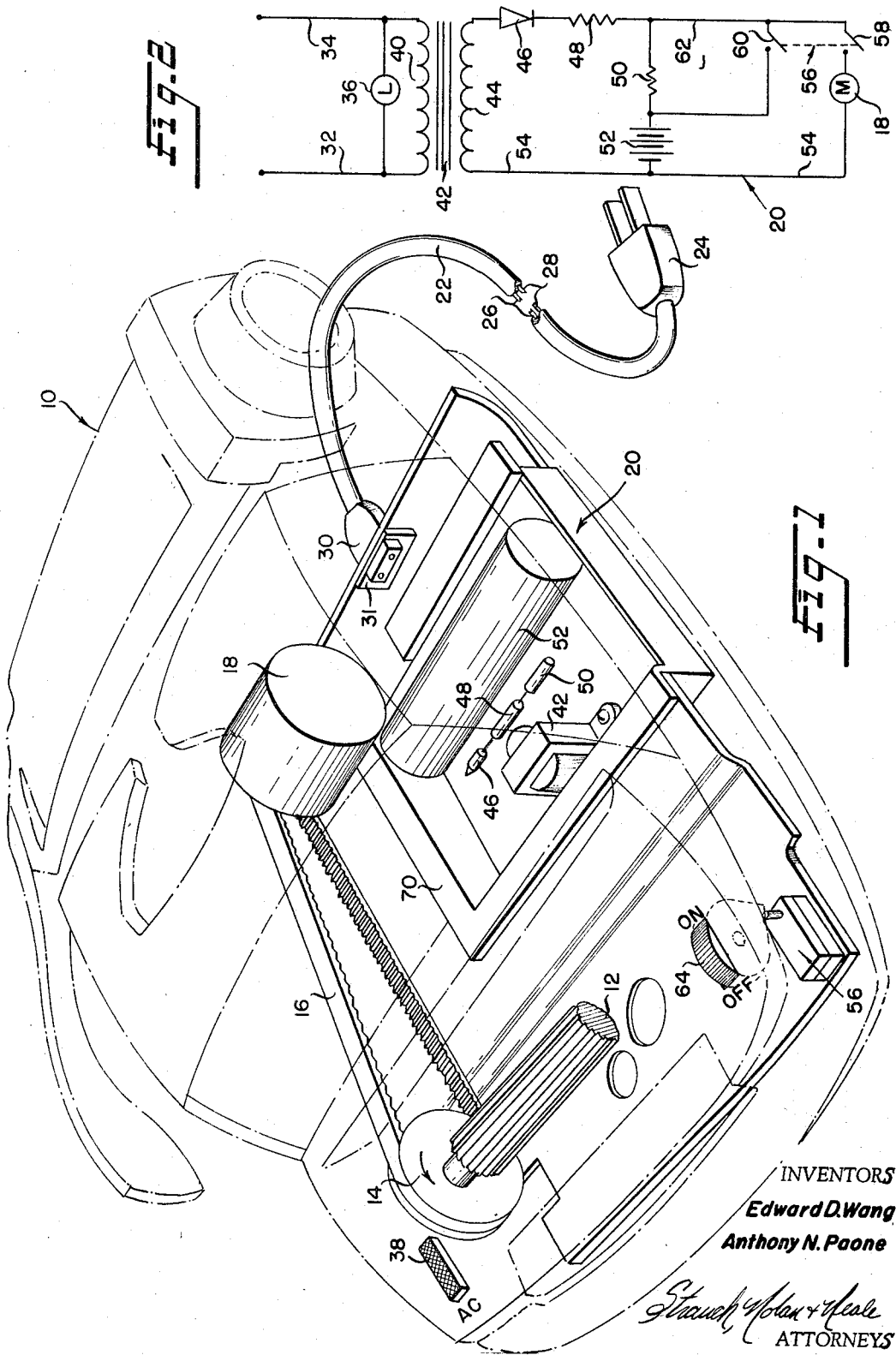

3,344,899
PORTABLE DATA TRANSFERRING MACHINES OPERABLE FROM EITHER DC OR AC CURRENT
Edward D. Wang, Dryden, and Anthony N. Paone, Syracuse, N.Y., assignors to SCM Corporation, New York, N.Y., a corporation of New York
Filed Apr. 22, 1963, Ser. No. 274,494
7 Claims. (Cl. 197—12)

This invention relates to portable electric data transferring machines and more specifically to portable electric data transferring machines selectively operable from a battery or an external power source. The term data transferring device includes machines such as typewriters and the present invention will be developed by relating it to typewriters. It is to be understood, however, that this invention is not limited to this one particular type of data transferring device.

Portable electric typewriters having alternating current motors for operating the typewriting mechanism are known as shown by United States Letters Patent Re. 25,011 to Barkdoll. Such typewriters have heretofore required a cord connection to a source of AC power. Not only is this power cord an inconvenience, but it also seriously restricts the usefulness of such typewriters. That is, the typewriters must be used in the vicinity of an AC power outlet, and the operator is thus precluded from utilizing the portable typewriter in automobiles, buses, trains, aircraft, or locations such as auditoriums, libraries, court rooms, press conference rooms, or remote locations where the required AC power is unavailable or the power outlet is not suitably located.

Accordingly, it is a primary object of this invention to provide completely portable electric data transferring devices which are utilizable in the absence of an external electric power source.

To accomplish this objective, the present invention provides a portable typewriter wherein all or part of the typewriting mechanism is actuated by a continuously rotating power roll operated by a belt driven by an electric current motor. A rechargeable battery is incorporated within the typewriter housing to provide power to operate the motor. Further, novel circuitry is provided which enables the battery to be recharged from an external power source, permits selective simultaneous operation of the typewriter motor from the external source and charging of the battery. The circuitry of the present invention thus permits three modes of operation of the electrical system of the typewriter: (1) battery operation of the typewriter motor, (2) recharging of the battery from an external source when the typewriter is off, and (3) simultaneous charging of the battery and operation of the typewriter motor from the external power source.

The present invention provides a very convenient portable electric typewriter which may be operated for several hours completely independently of any external power source, thereby enabling use of the typewriter in those locations exemplarily enumerated above. Further, continued use of the typewriter is possible upon return to a location having a convenient source of external power even while the battery is being recharged, although the battery can be recharged from the external source without operating the typewriter.

To provide for the above-described three mode operation of the applicants' novel electrical circuit, the secondary of a stepdown transformer is connected in series with a silicon diode to rectify the AC transformer output, and the secondary and diode are connected in series with current limiting resistances and with the typewriter battery. To provide for proper charging of the battery both when the typewriter motor is being simultaneously operated and when the motor is shut off, a portion of the current limiting resistance is adapted to be automatically shunted out of the circuit during operation of the motor.

Although series resistances adapted to be selectively shunted out of battery charging circuits are known, as shown by the United States Letters Patent Nos. 1,795,563 to Klock and 1,837,738 to Vencill, these patents merely recognize that under certain circumstances the charging current to the battery may desirably be increased. This increase is obtained in both patents by shunting a portion of the current limiting resistance in the battery charging circuit. However, these patents do not disclose the concept of nor the stucture for automatically shunting a portion of the current limiting resistance to maintain a proper charging rate both when the battery charging circuit is also furnishing current to drive a load in addition to the battery and when the load is not drawing any curent.

Accordingly, further objects of the present invention include:

(1) The provision of improved portable electric data transferring devices operable from self-contained batteries;

(2) The provision of impoved portable electric data transferring devices which are adapted for three mode operation: viz., motor operation directly from a self-contained battery, battery recharging from an extenal power source, and simultaneous battery recharging and motor operation from an external power source;

(3) The provision of battery operated data transferring devices wherein the batteries are located so as to enhance the stability of the devices;

(4) The provision of rechargeably-battery operated portable data transferring devices wherein the battery functions to smooth the electrical output of a rectified AC power source during one mode of operation of the device in which the battery is recharged simultaneously with operation of the device's motor from the AC source;

(5) The provision of improved rechargeable-battery opeated portable typewriters having circuit means adapted to ensure proper charging current is distributed to the batteries in each of two distinct battery charging modes of operation;

(6) The provision of improved portable data transferring devices according to the foregoing object wherein the proper charging current for the batteries is obtained in one mode of operation by shunting current-limiting-resistors in the battery charging circuits; and (7) The provision of self-powered electric data transferring devices that can be operated for a reasonable number of hours before restoration of the self-contained power sources is necessary.

These and other objects will appear more clearly from the following description and appended claims when read in conjunction with the accompanying drawings wherein:

FIGURE 1 is a perspective view of a portable electric typewriter according to the present invention with the external typewriter housing shown in phantom and a rechargeable battery power unit and electric drive mechanism thereof shown in solid lines; and FIGURE 2 is a schematic illustration of the electrical circuitry of the typewriter power unit.

The portable electric typewriter 10 shown generally in FIGURE 1, includes a conventional power roll 12 mounted transversely within the front portion of the typewriter to operate the type bars and other typewriter instrumentalities. The power roll is driven by a pulley 14 mounted at one end thereof and rotated by a toothed drive belt 16 extending rearwardly within the typewriter housing and over a small pulley (not shown) mounted on the drive shaft of a continuously rotating, relatively low torque DC motor 18 (motor 18 has 13 inch-oz. torque, in one specific embodiment).

An electric power unit 20 of novel construction is mounted within typewriter 10 to provide power for motor 18. A power cord 22 extending from the back of typewriter 10 and power unit 20 has a plug 24 selectively connectable with a suitable external power outlet.

As shown in greater detail in FIGURES 1 and 2, the two conductors 26 and 28 of power cord 22 terminate in a female plug 30 removably connected with pin-like terminals (not shown) of a plug 31 mounted on typewriter 10. These pins are connected to input leads 32 and 34 (FIGURE 2) of power unit 20. An indicator light 36 is connected across the input leads and is mounted in typewriter 10 to shine through a light transmitting member 38 mounted adjacent the keyboard of the typewriter.

A primary winding 40 of a transformer 42 is also connected across the input leads 32 and 34. A secondary winding 44 of transformer 42 is serially connected with a diode 46, current limiting resistors 48 and 50 and a battery 52 (which in one specific embodiment is a nickel-cadmium battery of 4.8 nominal voltage, 2.3 ampere hour capacity, and a 16 hour-230 milliampere charging rate manufactured by Nicad Division of Gould-National Batteries, Inc.).

Motor 18 of typewriter 10 may be selectively connected across the terminals of battery 52 by a conductor 54 connecting one side of motor 18 to the negative terminal of battery 52 and by a double pole single throw switch 56 selectively connecting the other side of motor 18 to the positive terminal of battery 52 through poles 58 and 60 of switch 56. Pole 60 of the switch is further adapted to shunt current limiting resistor 50 by a conductor 62 when switch 56 is closed. Switch 56 is mounted within typewriter 10 with its actuator 57 directly under a switch operating knob 64 which protrudes through the keyboard panel at the front of the typewriter.

The above-described electrical components of power unit 20 are suitably mounted by a tray-like member 70 within typewriter 10. The heavy components, viz., the battery and transformer, of the power unit are mounted near the lower rear portion of the typewriter so as to enhance the stability of the typewriter in both the horizontal operating position and particularly in the vertical storage, or carrying, position.

Three modes of operation of the electrical power unit 20 of the present invention are provided. First, when power cord 22 is disconnected and control switch 56 is closed, current flows directly from battery 52 through poles 60 and 58 of the switch to motor 18 to continuously rotate power roll 12 of the typewriting mechanism, thus providing the completely portable and self contained utility of the present invention. Battery 52 is prevented from discharging through the secondary 44 of the transformer by diode 46 which permits current flow only in the direction schematically indicated in FIGURE 2.

After a period of operation of the typewriter from battery 52 (which in one specific embodiment may be as long as five hours), plug 30 of power cord 22 is plugged into the plug 31 at the rear of the typewriter and plug 24 is plugged into a suitable AC outlet to energize the primary of the transformer and to simultaneously light indicator 38 to indicate that AC power is being supplied to the electrical circuit of the power unit.

If it is desired to merely recharge the battery, typewriter operating switch 56 is left in the off or open position, and diode 46 permits half-wave rectified current to flow from the secondary 44 through the diode, resistors 48 and 50, the battery 52, and lead 54 to charge the battery. The total resistance of resistors 48 and 50 is suitably selected to limit maximum charging current to a value which will not adversely affect the components of the charging system, especially the battery, and yet will permit adequately recharging current so that battery 52 may be recharged within a reasonable period.

At any time during the recharging process, or when the battery is fully recharged, typewriter control switch 56 may be closed to energize motor 18 to operate the typewriter mechanism actuating power roll 12. When switch 56 is closed, pole 58 is effective to energize motor 18 while pole 60 is effective to shunt resistance 50 (which in one specific embodiment has 3 to 5 times the resistance of resistor 48). By this means, a proper charging voltage is maintained across the terminals of battery 52 during the simultaneous operation of typewriter motor 18 since the increased current flow through resistor 48 due to the motor load causes a greater voltage drop thereacross than is present when only the battery is drawing current from the secondary of the transformer. Therefore, during simultaneous operation of motor 18 and recharging of the battery, the latter receives a trickle or floating charge. In addition, because of its inherent capacitance, battery 52 is effective to smooth the half-wave rectified current supplied to the motor.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A portable data transferring device capable of operating from an external AC power sources and from a self-contained DC power source, comprising:
   (a) an operating mechanism;
   (b) a DC motor operatively connected to said operating mechanism;
   (c) a rechargeable battery adapted to operate said motor; and
   (d) battery charging and motor operating circuit means for selectively either connecting said motor to said battery or connecting said motor and said battery to an external AC power source, comprising:
      (1) a transformer having a primary adapted to be connected to the external power source;
      (2) circuit means connecting said motor across the secondary of the transformer;
      (3) circuit means connecting the battery to said secondary and said motor;
      (4) means for rectifying the current supplied to and the voltage applied across said battery and said motor by said transformer;
      (5) circuit means connecting said battery in series with said motor; and
      (6) a two-position switch means selectively operable in one position thereof to interrupt the motor-transformer secondary circuit and complete a first transformer secondary-battery circuit, whereby said battery may be charged without operation of said motor when the transformer primary is connected across the external power source to energize the transformer;
      (7) said switch means being operable in the other position thereof to simultaneously complete the transformer secondary-motor and battery-motor circuits and a second and distinct transformer secondary-battery circuit, whereby said motor can be operated from said power source and said battery simultaneously charged when said transformer is connected to said external power source and said motor operated from said battery when there is no connection between the battery and the external power source.

2. The device of claim 1, wherein:
   (a) the means connecting the motor across the transformer secondary comprises first and second leads;
   (b) the means connecting the battery to the motor and transformer secondary comprises a third lead connecting the battery across the first and second leads in parallel with the motor and transformer secondary; and (c) there is a circuit including a fourth lead connecting the battery in series with the motor.

3. Electrically powered apparatus capable of operating from an external AC power source and from a self-contained DC power source, comprising:
(a) a DC power consuming device;
(b) a rechargeable battery adapted to operate said device; and
(c) battery charging and device operating circuit means for selectively either connecting said device to said battery or connecting said device and said battery to an external AC power source, comprising:
(1) a transformer having a primary adapted to be connected to the external power source;
(2) circuit means connecting said device across the secondary of the transformer;
(3) circuit means connecting the battery in parallel with said secondary and said device;
(4) means connected in series with the transformer secondary for rectifying the current supplied to and the voltage applied across said battery and said device by said transformer;
(5) circuit means connecting said battery in series with said device; and
(6) a two-position switch means selectively operable in one position thereof to interrupt the device-transformer secondary circuit and complete a first transformer secondary-battery circuit, whereby said battery may be charged without operation of said device when the transformer primary is connected across the external power source to energize the transformer;
(7) said switch means being operable in the other position thereof to simultaneously complete the transformer secondary-device and battery-device circuits and a second and distinct transformer secondary-battery circuit, whereby said device can be operated from said power source and said battery simultaneously charged when said transformer is connected to said external power source and said device operated from said battery when there is no connection between the battery and the external power source.

4. A portable data transferring device capable of operating from an external AC power source, and from a self-contained DC power source, comprising:
(a) an operating mechanism;
(b) a DC motor operatively connected to said operating mechanism;
(c) a rechargeable battery adapted to operate said motor; and
(d) battery charging and motor operating circuit means for selectively connecting said motor to said battery and for selectively connecting said motor and said battery to an external AC power source, comprising:
(1) a transformer having a primary adapted to be connected to the external power source;
(2) circuit means connecting said motor across the secondary of the transformer;
(3) circuit means connecting the battery to said secondary and said motor;
(4) means for rectifying current supplied to and the voltage applied across said battery and said motor by said transformer;
(5) circuit means connecting said battery in series with said motor;
(6) first and second resistances for limting the current supplied by said transformer to said battery and to said motor; and
(7) switch means selectively operable to either:
(a) interrupt the motor-transformer secondary circuit without interrupting the transformer secondary-battery circuit, whereby said battery may be charged without operation of said motor when the transformer primary is connected across the external power source to energize the transformer, and to simultaneously operatively connect both of said resistances in series between said battery and the transformer secondary to limit the flow of current through and thereby prevent overcharging of the battery when said motor is not running; or
(b) simultaneously complete the transformer secondary-motor and battery-motor circuits without interruption of the transformer secondary-battery circuit, whereby said motor can be operated from said power source and said battery simultaneously charged when said transformer is connected to said external power source and said motor operated from said battery when there is no connection between the battery and the external power source, and to, simultaneously with the completion of the foregoing circuits, operatively connect one of said resistances only between said motor and the transformer secondary and between said secondary and said battery and said motor directly to said battery around said resistances to thereby increase the current supplied by said transformer secondary when the motor is operated and said battery simultaneously charged from said external power source and to bypass said resistances and reduce circuit resistance to a minimum when said motor is operated from said battery.

5. A portable data transferring device capable of operating from an external AC power source and from a self-contained DC power source, comprising:
(a) an operating mechanism;
(b) a DC motor operatively connected to said operating mechanism;
(c) a rechargeable battery adapted to operate said motor; and
(d) battery charging and motor operating circuit means for selectively connecting said motor to said battery and for selectively connecting said motor and said battery to an external AC power source, comprising:
(1) a transformer having a primary adapted to be connected to the external power source;
(2) circuit means connecting said motor across the secondary of the transformer;
(3) circuit means connecting the battery to said secondary;
(4) means for rectifying the current supplied to and the voltage applied across said battery and said motor by said transformer;
(5) first and second current limiting resistances connected in series with the transformer secondary and the battery, said first resistance also being connected between said secondary and said motor;
(6) circuit means connecting said battery in series with said motor, said last-named circuit means including a shunt lead connected between the battery and the second resistance at one end, the other end of said shunt lead being connected between the first resistance and the motor; and
(7) switch means selectively operable to:
(a) interrupt the motor-transformer secondary circuit without interrupting the transformer secondary-battery circuit, whereby said battery may be charged without operation of said motor when the transformer primary is connected across the external power source to energize the transformer, and to interrupt the continuity in said shunt lead and connect said battery to said transformer secondary through both of said resistances to thereby limit the flow of current through said battery and prevent overcharging of the battery when said motor is not running; and (b) simultaneously complete the transformer secondary-motor circuit and the continuity of the shunt lead in the battery-motor circuit without interruption of the transformer secondary-battery circuit, whereby said motor can be operated from said power source and said battery simultaneously charged when said transformer is connected to said external power source and said motor operated from said battery when there is no connection between the battery and the external power source and whereby the second of said resistances is bypassed and only the first of said resistances is interposed between said motor and the transformer secondary and between said secondary and said battery and said motor is connected directly to said battery around said resistances to thereby increase the current supplied by said transformer secondary when the motor is operated and said battery simultaneously charged from said external power source and to bypass said resistances and reduce circuit resistance to a minimum when said motor is operated from said battery.

6. A portable data transferring device capable of operating from an external AC power source and from a self-contained DC power source, comprising:
(a) an operating mechanism;
(b) a DC motor operatively connected to said operating mechanism;
(c) a rechargeable battery adapted to operate said motor; and
(d) battery charging and motor operating circuit means for selectively connecting said motor to said battery and for selectively connecting said motor and said battery to an external AC power source, comprising:
(1) a transformer having a primary adapted to be connected to the external power source;
(2) a circuit including first and second leads connecting said motor across the secondary of the transformer;
(3) a third lead connecting said battery across said first and second leads in parallel with said motor and said transformer secondary;
(4) means connected in series with the transformer secondary for rectifying the current supplied to and the voltage applied across said battery and said motor by said transformer;
(5) first and second resistances for limiting current flow through said battery and said motor, the first resistance being interposed in one of the leads connecting the motor across the transformer secondary between the transformer secondary and the third lead, whereby said first resistance is connected in series with said battery and said motor, said second resistance being interposed in said third lead;
(6) circuit means connecting said battery in series with said motor, said last-named circuit means including a fourth lead connected between the battery and the second resistance at one end, the opposite end of the fourth lead being connected between the first resistance and the motor; and
(7) switch means selectively operable to:
(a) interrupt the continuity of said fourth lead and one of the leads connecting the motor across the transformer secondary between said one lead and the third lead, whereby said battery may be charged without operation of said motor when the transformer is connected across the external power source and said battery is connected to the transformer secondary transformer through both the first and second resistances to limit the flow of current through said battery to the maximum extent and thereby prevent overcharging of the battery when the motor is not running; and
(b) complete the continuity of said one lead and said third lead, whereby said motor can be operated from said power source and said battery simultaneously charged when said transformer is connected to said external power source and said motor operated from said battery when there is no connection between the battery and the external power source and whereby the second of said resistances is bypassed and only the first of said resistances is interposed between said motor and the transformer secondary and between said secondary and said battery and said motor is connected directly to said battery around said resistances to thereby increase the current supplied by said transformer secondary when the motor is operated and said battery simultaneously charged from said external power source and to bypass said resistances and reduce circuit resistance to a minimum when said motor is operated from said battery.

7. Electrically powered apparatus capable of operating from external AC power source and from a self-contained DC power source, comprising:
(a) a DC power consuming device;
(b) a rechargeable battery adapted to operate said device; and
(c) battery charging and device operating circuit means for selectively connecting said device to said battery and for selectively connecting said device and said battery to an external AC power source, comprising:
(1) a transformer having a primary adapted to be connected to the external power source;
(2) circuit means connecting said device across the secondary of the transformer;
(3) circuit means connecting the battery to said secondary and said device;
(4) means for rectifying the current supplied to and the voltage applied across said battery and said device by said transformer;
(5) circuit means connecting said battery in series with said device;
(6) first and second resistances for limiting the current supplied by said transformer to said battery and to said device; and
(7) switch means selectively operable to:
(a) interrupt the device-transformer secondary circuit without interrupting the transformer secondary-battery circuit, whereby said battery may be charged without operation of said device when the transformer primary is connected across the external power source to energize the transformer, and to operatively connect both of said resistances in series between said battery and the transformer secondary to limit the flow of current through and thereby prevent overcharging of the battery when said device is not running; and (b) simultaneously complete the transformer secondary-device and battery-device circuits without interruption of the transformer secondary-battery circuit, whereby said device can be operated from said power source and said battery simultaneously charged when said transformer is connected to said external power source and said device operated from said battery when there is no connection between the battery and the external power source, and to operatively connect one of said resistances only between said device and the transformer secondary and between said secondary and said battery and said device directly to said battery around said resistances to thereby increase the current supplied by said transformer secondary when the device is operated and said battery simultaneously charged from said external power source and to bypass said resistances and reduce circuit resistance to a minimum when said device is operated from said battery.

References Cited

UNITED STATES PATENTS

| | | | |
|---|---|---|---|
| 429,359 | 6/1890 | McLoughlin | 197—13 |
| 718,758 | 1/1903 | Harrison | 197—12 |
| 938,354 | 10/1909 | Tompkins | 197—13 |
| 1,479,621 | 1/1924 | Nichols | 197—13 |
| 1,927,761 | 9/1933 | Tauschek | 197—14 |
| 2,901,079 | 8/1959 | Barkdoll | 197—17 |
| 3,049,623 | 8/1962 | DuVall | 307—66 |
| 3,108,191 | 10/1963 | Bagno | 307—66 |
| 3,108,192 | 10/1963 | Reich | 320—2 X |
| 3,136,115 | 6/1964 | Calabrese | 320—2 X |
| 3,184,775 | 5/1965 | Downey et al. | 320—2 X |
| 3,214,670 | 10/1965 | Schaf | 307—66 X |

ROBERT E. PULFREY, *Primary Examiner.*

E. S. BURR, *Assistant Examiner.*

UNITED STATES PATENT OFFICE
CERTIFICATE OF CORRECTION

Patent No. 3,344,899            October 3, 1967

Edward D. Wang et al.

It is hereby certified that error appears in the above numbered patent requiring correction and that the said Letters Patent should read as corrected below.

Column 2, line 14, for "stucture" read -- structure --; line 23, for "impoved" read -- improved--; line 39, for "opeated" read -- operated --; column 4, line 30, for "sources" read -- source --; column 5, line 70, for "limting" read -- limiting --.

Signed and sealed this 5th day of November 1968.

(SEAL)
Attest:

Edward M. Fletcher, Jr.
Attesting Officer

EDWARD J. BRENNER
Commissioner of Patents

UNITED STATES PATENT OFFICE
CERTIFICATE OF CORRECTION

Patent No. 3,344,899                          October 3, 1967

Edward D. Wang et al.

It is certified that error appears in the above identified patent and that said Letters Patent are hereby corrected as shown below:

In the lower portion of Figure 1, the upwardly projecting actuator from switch 56 should be denoted by reference numeral 57 with a lead line thereto; column 1, line 46, for "source," read -- source and also --; column 2, line 46, strike out the "hyphen", second occurrence; column 5, line 70, for "limting" read -- limiting --.

Signed and sealed this 29th day of July 1969.

(SEAL)

Attest:

Edward M. Fletcher, Jr.

Attesting Officer

WILLIAM E. SCHUYLER, JR.

Commissioner of Patents